United States Patent
Paine et al.

(10) Patent No.: US 8,159,550 B2
(45) Date of Patent: Apr. 17, 2012

(54) PRESENTING IMAGES AS MOSAICS

(75) Inventors: Mallory Jackson Paine, San Jose, CA (US); Devang Kalidas Naik, San Jose, CA (US); Steve Ko, San Francisco, CA (US); Joshua Matthew Williams, San Jose, CA (US); John William Scalo, Santa Cruz, CA (US); Kim E. A. Silverman, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 868 days.

(21) Appl. No.: 11/425,898

(22) Filed: Jun. 22, 2006

(65) Prior Publication Data

US 2007/0296824 A1    Dec. 27, 2007

(51) Int. Cl.
*H04N 5/228*    (2006.01)
(52) U.S. Cl. ..................... 348/222.1; 348/284
(58) Field of Classification Search .................. 382/284; 348/222.1
See application file for complete search history.

(56) References Cited

U.S. PATENT DOCUMENTS

| | | | | |
|---|---|---|---|---|
| 6,137,498 | A * | 10/2000 | Silvers | 345/629 |
| 6,549,679 | B1 * | 4/2003 | Zheng | 382/284 |
| 6,956,573 | B1 * | 10/2005 | Bergen et al. | 345/473 |
| 6,959,573 | B2 * | 11/2005 | Matsumoto et al. | 72/31.11 |
| 7,593,043 | B2 * | 9/2009 | Uezono | 348/222.1 |
| 2002/0041626 | A1 * | 4/2002 | Yoshioka et al. | 375/240 |
| 2005/0147322 | A1 * | 7/2005 | Saed | 382/284 |
| 2006/0003328 | A1 * | 1/2006 | Grossberg et al. | 435/6 |
| 2006/0274156 | A1 * | 12/2006 | Rabbani et al. | 348/208.99 |
| 2007/0250197 | A1 * | 10/2007 | Glass et al. | 700/96 |

* cited by examiner

*Primary Examiner* — Usman Khan
(74) *Attorney, Agent, or Firm* — Fish & Richardson P.C.

(57) ABSTRACT

Apparatus, methods and systems for creating mosaics are described. A method is provided that includes identifying an image for presentation as a mosaic; dividing the identified image into a plurality of tiles; scoring each tile; identifying a matching image from an image dataset using the score for each tile; and rendering the mosaic using the matching images.

40 Claims, 10 Drawing Sheets

PRESENTING IMAGES AS MOSAICS

FIELD

The present invention relates generally to generating images.

BACKGROUND

A computer generated mosaic or compilation is a graphical representation that includes an intelligent arrangement of discrete tiles or sub-images collated to render an arbitrarily selected underlying image. Each individual tile can generally be of the form of a group of colored pixels or an image. A plurality of tiles are selected for placement in the mosaic from a corpus of images enable a rendering of an image on a user interface that, when viewed at a sufficient distance or angle, matches the underlying image. The quality of the mosaic that is generated is proportional to and dependent on the availability of an adequate number of tiles, that matches the distribution of color, gradient and orientation within the underlying image. As described above, each tile of a mosaic can be composed of individual images, such as photographs a person can take with, for example, a digital camera. Using photographs to produce a mosaic is particularly popular because it is possible to personalize the entire mosaic with images of a particular characteristic or theme (e.g., the faces of people, flowers, animals, etc.).

SUMMARY

Systems, apparatus, methods and computer program products are described below for generating a mosaic. In general generation of the mosaic includes identifying an image dataset, identifying an image (e.g., a target image) which the mosaic will represent, dividing the identified image into tiles, scoring each tile, selecting an image from the image dataset which will replace each tile in the identified image and presenting the mosaic with the selected images for display. The details of which are described below in full.

In one aspect a method is provided that includes identifying an image for presentation as a mosaic; dividing the identified image into a plurality of tiles; scoring each tile; identifying a matching image from an image dataset using the score for each tile; and rendering the mosaic using the matching images.

These and other embodiments can optionally include one or more of the following features. Identifying the image can include selecting the image from a set of images. The set of images can be defined by a user. Dividing can include dividing the image into a plurality of equal sized tiles. The tiles can be rectangular. Dividing can includes dividing the image into a plurality of tiles having at least two different sizes. Dividing can include dividing the image into a plurality of tiles having at least two different shapes. Scoring can include scoring based on color. Scoring can include sampling the image and scoring the samples. Scoring can include transforming the image using one or more of a discrete cosine or discrete sine transform to produce a score. Scoring can include: acquiring sampled data from the image; transforming the sampled data using a transformation function to produce transformed data; and evaluating the transformed data to produce a score. The transformation function can be a discrete cosine transform or discrete sine transform or a (e.g., weighted) combination of the two. Evaluating can include selectively evaluating portions of the transformed data. Evaluating includes ignoring all but the most significant transformed data values. Scoring a tile can include evaluating less than all of the image data for the tile to produce the score. Identifying a matching image can include evaluating thumbnail images. Identifying a matching image includes identifying potentially matching images, scoring the potentially matching images and locating a best matching image from the scored potentially matched images. Scoring potentially matching images can include scoring a lesser resolution image associated with each potentially matching image. The lesser resolution image can be a thumbnail. Identifying a matching image from the image dataset using a score for each tile can include identifying an image with a score closest to the score of the tile. The dataset can be a kd-tree and identifying can include searching the kd-tree for the matching image. The method can include storing the dataset, including scores for each image in the dataset. The image dataset can be retrieved from storage. The method can include, prior to displaying the first image, identifying a next image for presentation as a mosaic; replacing a matching tile in the image with the next image, and rendering the mosaic using the matching images and the next image. The method can include zooming toward the next image including scaling the mosaic. The method can include stopping zooming when the next image occupies a predetermined portion of the display. The predetermined portion can be the whole display. The predetermined portion can include a predetermined number of whole or partial images along with the next image. Sampling the image can be based on a zigzag pattern of pixel selection.

In another aspect a method is provided that includes creating a first mosaic including identifying a next image in the first mosaic; presenting the first mosaic; zooming the first mosaic toward the next image; and presenting the next image as a next mosaic.

In another aspect a method is provided that includes identifying an image; identifying a plurality of portions of the image; evaluating each portion; identifying a matching image for one or more portions based on the evaluation; and creating a mosaic using the matching images.

In another aspect a method is provided that includes identifying a first image to be presented as a compilation; presenting one of the first image or a second image; and adjusting a focus so that the presented image is presented along with a portion of the compilation.

In another aspect a method is provided that includes identifying a first image to be presented as a first compilation; presenting a second compilation that includes the first image; adjusting a focus so that the first image is presented along with only a portion of the second compilation; and presenting the first compilation.

These general aspects may be implemented, for example, using a method and an apparatus. An apparatus may include one or more computer readable media having instructions stored thereon and configured to result in one or more of the general aspects being performed. An apparatus may include one or more pieces of structure for performing operations in one or more of the general aspects. A method may include the operations that are performed, or the operations that structure is configured to perform, in one or more of the general aspects.

Particular implementations of these aspects can realize one or more of the following advantages. Image processing techniques are provided that allow for the scoring of individual images and the storing of the scores for quick retrieval and searching. Using a data structure can reduce processing time when selecting an image for inclusion in a mosaic. Furthermore, the data structure can be persisted to disk thereby avoiding unnecessary re-processing of images between the generation of multiple mosaics. Image scoring that processes sampled image data rather than the entire image reduces processing operations and or time and makes mosaic generation more timely. Using thumbnails as image sources, rather than the image to which the thumbnail refers, can further reduce processing and memory consumption. Image scoring based on image compression techniques such as discrete cosine transforms and discrete sine transforms can provide more accurate image matching, leading to better looking mosaics. Zooming into a displayed mosaic provides viewers an opportunity to look more closely at the images which constitute the mosaic.

The details of one or more implementations are set forth in the accompanying drawings and the description below. Other features will be apparent from the description, the drawings, and the claims.

DESCRIPTION OF FIGURES

Like reference numbers and designations in the various drawings indicate like elements.

DETAILED DESCRIPTION

With reference to FIGS. 1A-C and FIG. 2, a method 200 is shown for the generation and display of a mosaic or compilation. In an initial step, an image dataset is identified 210. The image dataset contains a set of images or pointers thereto which can be used by the method 200 to create a mosaic The dataset can be identified by a user or received from the same or another process. The dataset can be local or remote, that is, the dataset can include images that are located remotely from a device executing the method. An image refers to image data that includes a multi-dimensional (e.g., two dimensional) array of pixels, where each pixel encodes values that describe the image (e.g., in terms of color and intensity) at a particular position. An image file encapsulates image data into a discrete container and can include additional data describing properties of the image. In one implementation, the image file formats, whose precise formats are publicly available, are selected from the group consisting of Portable Document Format (PDF), Encapsulated PostScript (EPS), Tagged Image File Format (TIFF), Graphic Interchange Format (GIF), Joint Photographic Experts Group (JPEG), Portable Native Graphic (PNG), Macintosh Picture Format (PICT), Windows Bitmap Format (DIB), Windows Icon Format, Icon File Format, Adobe RAW, Canon 2 RAW, Canon RAW, FlashPix, Fuji RAW, Kodak RAW, MacPaint, Minolta RAW, Nikon RAW, Olympus RAW, OpenEXR, Photoshop, QuickTime Import Format, Radiance, SGI, Sony RAW, Targa, Windows Cursor, XWindow bitmap. In one implementation, identifying the image dataset includes initializing the image dataset. Initializing can include scoring images in the image data set. Initialization of the image dataset is described in greater detail below in association with FIG. 3.

After initialization, the image dataset includes a set of images which have been processed and are eligible for inclusion in the mosaic. As described above, in one implementation the image dataset can be local, meaning that the dataset operates in the same environment in which the generation of the mosaic occurs (e.g., in memory, on disk, etc.). In another implementation the image dataset can be remote; that is the dataset operates in an environment separate from the environment in which generation of the mosaic occurs (e.g., on a network, internet, etc.).

Figure 1A:
FIG. 1A shows a exemplary image that can be converted into a mosaic.

An image is identified 220 that will be the subject of the mosaic (e.g., image 110 shown in FIG. 1A). The mosaic once generated should, and generally will, resemble the identified image. In one implementation, a user can identify an image to be the subject of a mosaic from a list of accessible or designated files (e.g., using a file browser). Alternatively, an external process can identify the image. In yet another implementation a default setting, or a remote resource can identify the image. In one implementation, the image is received from an input device such as a digital camera, scanner, or video camera. The identified image can be selected automatically by the user or by a selection process. Selection processes can be random or pseudo random, or based on selection criteria. No matter the selection criteria, ultimately an image is identified that is to be the subject of the mosaic.

Figure 1B:
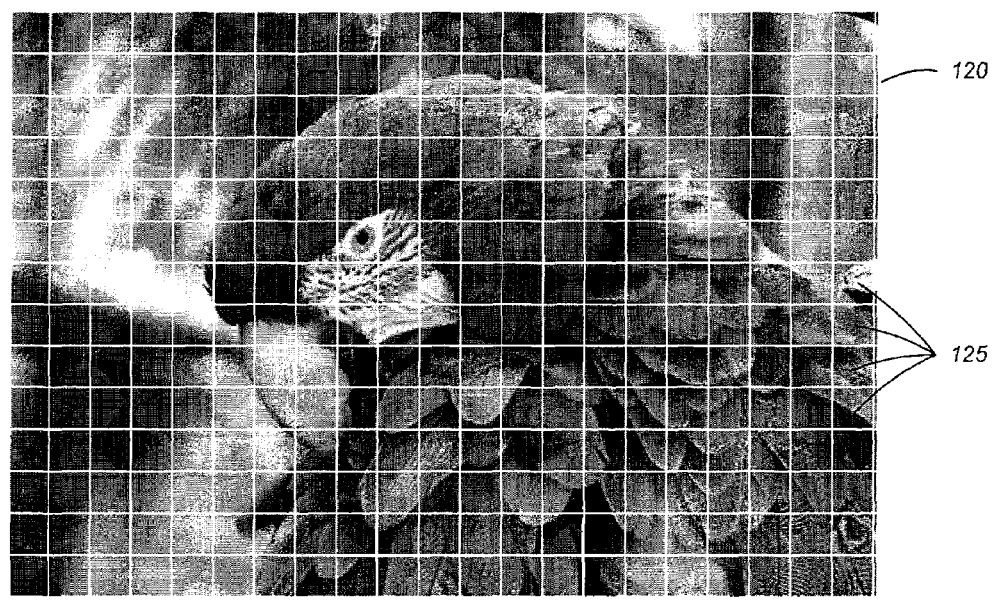
FIG. 1B shows a tiled version of the exemplary image of FIG. 1A.
Figure 1C:
FIG. 1C shows a mosaic of the exemplary image of FIG. 1A.
Figure 2:
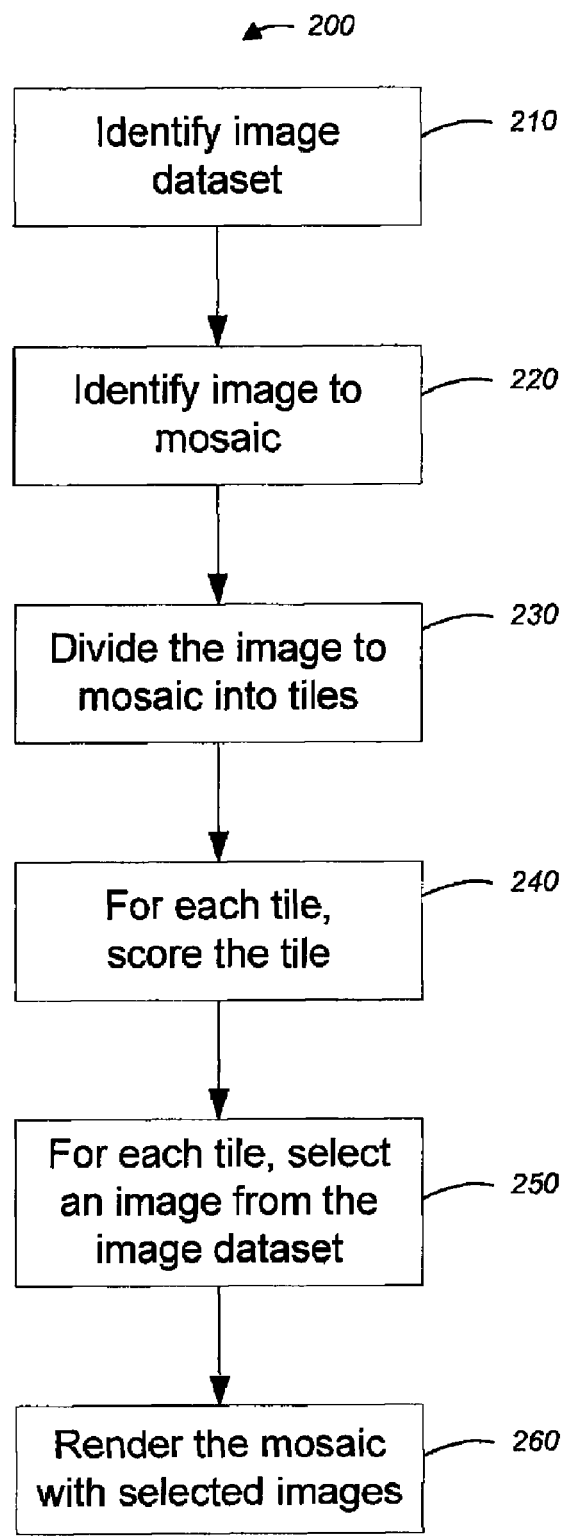
FIG. 2 shows a method for generating a mosaic.

The identified image is divided into separate non-overlapping tiles 230. Each tile of the image represents a discrete portion of the original image (e.g., tiles 125 shown in image 120, FIG. 1B). In some implementations, the tiles are uniformly sized and shaped. In other implementations, not all the tiles are the same size, or the same shape. An implementation can divide the identified image into uniform rectangular tiles (as shown in FIG. 1B). A second implementation can divide the identified image into non-uniform rectangles. A third implementation can divide the identified image into a series of octagons and squares of various sizes. Yet another implementation can divide the identified image into circular and other shapes. Moreover, one implementation allows for selectable division which can be determined with configuration settings. Such configuration settings can be implicitly or explicitly designated (e.g., provided by the user or the environment).

Having divided the image into a series of tiles, each tile is scored 240. One example of a scoring method is described below in association with FIG. 4. Image scoring produces a result (e.g., a value, a set of values, a number or set of numbers, a vector, etc.) which characterizes the image. In one implementation, the result characterizes a color of the tile. In a second implementation the result returns an n-best sequence of matches that may be rescored to yield a score suited to color, gradient or orientation of the image subsets.

A tile's score is used to select an image from the image dataset 250. Image selection is described in detail below in association with FIG. 5. Image selection can include selecting an image with a score that is closest to the score associated with a given tile. In one implementation, once an image in the dataset is selected for use in the mosaic, the selected image may not be used again in the mosaic. Alternatively, the same image can be used multiple times. In one implementation, the use of an image is limited by parameters defining a proximity (e.g., the image can only be selected if selection would not place the image within a predefined distance of another instance of the same image). Image selection includes replacing the given tile in the image with the selected image in order to produce the mosaic. The mosaic can be rendered and displayed 260. Rendering the mosaic refers to a process of optionally transforming the selected images and placing the transformed images in the mosaic such that the mosaic can be displayed on a display device. For example, in FIG. 1C, the image 130 is a mosaic of image 110 where each tile has been replaced by an image 135. The rendering process is described in detailed below in association with FIG. 6.

Initializing the Image Dataset

Figure 3:
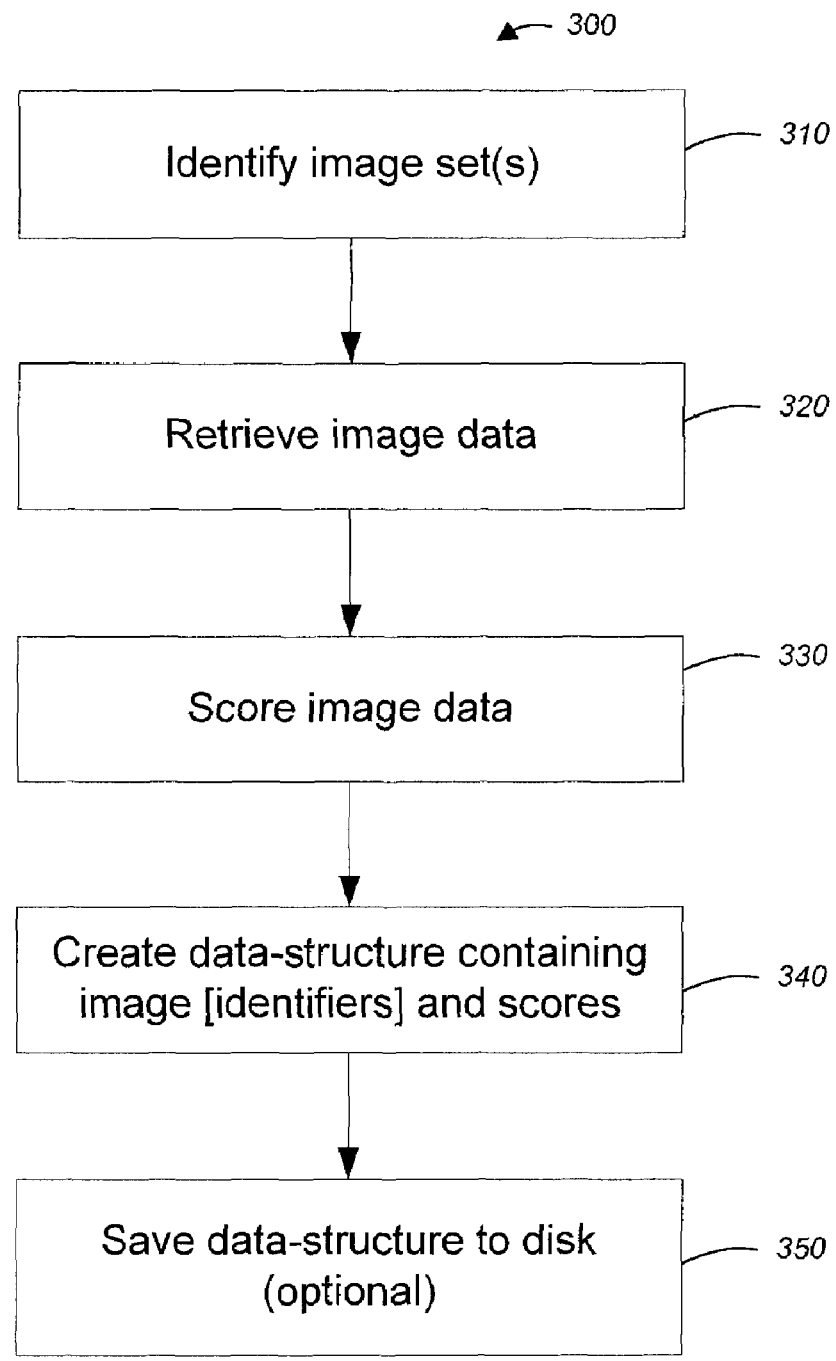
FIG. 3 shows a method for initializing an image dataset.

As shown in FIG. 3, a method 300 is shown for initializing an image dataset. The process identifies a set of images 310. The image set contained in the image dataset will be used to construct a given mosaic. In one implementation selection is accomplished when a user chooses a set of images (e.g., choosing from a list of images, from a list of image files, or browsing using a file browser or an image browser, etc.). Alternatively, one or more locations associated with a set of files can be identified by the user (e.g., the user can identify a photo library or an iPhoto file on a computing device). An implementation can receive one or more directories of which any images contained in a given directory (and optionally, a directory's subdirectory) constitute the image set. A location can also specify a remote resource accessible via a network (e.g., over the internet). Another implementation can utilize a generic or specialized data repository that contains images, for example a relational dataset system. Yet another implementation can receive one or more image sets from an external process.

Image data from each image in the image set is retrieved 320. The extent and method of image retrieval can vary among implementations. One implementation can retrieve all available image data associated with each image. Other implementations however, can retrieve a subset of image data associated with each image (e.g., every $5^{th}$ pixel is retrieved). For example, one implementation can retrieve a fixed number of pixels from each image. In one implementation the particular pixels are selected randomly or pseudo randomly. Alternatively, predefined pixels can be selected. In one implementation image data can be acquired from a completely separate source, to avoid incurring the cost, in part or in whole, of the image retrieval process. Such an implementation can use image data that has already been created by a separate external process or application. For example, an implementation can use a thumbnail of a selected image rather than the selected image. A thumbnail is an image that can be constructed from another (e.g., full-sized) image and typically includes a subset of image data that is representative of the another image from which the thumbnail is constructed. The thumbnail contains less image data but, when displayed, can still resemble the full-sized image from which the thumbnail is constructed. A thumbnail can also contain additional data pertaining to the full-sized image the thumbnail is constructed from including, but not limited to, the size, name, orientation and color properties of the full-size image. An external application such as image viewing applications, (e.g., iPhoto of Apple Computer Inc. of Cupertino, Calif., or Windows Image Viewer of Microsoft Corporation of Redmond, Wash.), can produce thumbnails from a user's library of images. Retrieving image data can include retrieving image data from thumbnails that have already been produced by an application that produces thumbnails. In some implementations, the retrieved image data can be further processed. For example, a thumbnail produced by iPhoto is typically 240 pixels wide by 180 pixels high or 360 pixels wide by 270 pixels high and can be further transformed so that the image is smaller in size (e.g., 80 pixels wide by 60 pixels high) prior to scoring (see step 330 below). Alternatively, a full size image can be retrieved, and processed by a sampling operation or otherwise. The processed image can then be used in the further steps associated with initialization.

Each image that is identified is subsequently scored 330 according to, for example, the scoring process described below in association with FIG. 4. Scoring can be performed on the image itself or on a representative form of the image (e.g., a thumbnail image).

Having identified and scored each image to be stored in the image dataset, a datastructure can be created 340. In one implementation, the datastructure includes the identified images 320 or pointers' thereto and the image scores 330. The datastructure provides a mechanism by which data is stored and ordered. Each image identified can be inserted into the datastructure, according, for example, to the identified image's score. Creating the datastructure facilitates searching of the data that the datastructure contains. For example, a datastructure that is organized by score allows, for a given score, the quick identification of an image whose score is the closest to the score given (e.g., a nearest-neighbor search). In one implementation a datastructure such as kd-tree is used to organize each image according to their scores. A kd-tree is a space-partitioning datastructure well suited to organizing data in a k-dimensional space (described by Jon Louis Bentley in 'Multidimensional binary search trees used for associative searching' found in Communications of the ACM, volume 18, issue 9, September 1975, pages 509-517). Another implementation can use an alternate datastructure such as an antipole tree. Antipole tree's support range and nearest neighbor searching in a datastructure and are described in "Antipole Tree Indexing to Support Range Search and k-Nearest Neighbor Search in Metric Spaces" (by Domenico Cantone, Alfredo Ferro, Alfredo Pulvirenti, Diego Reforgiato Recupero, and Dennis Shasha, IEEE Transactions on Knowledge and Data Engineering, 17(4), 2005). Other datastructures and other organization schemes are possible. The datastructure can be saved for easy retrieval either locally or remotely (350). An implementation can save data to non-volatile storage (e.g., disk).

Once produced, the datastructure can be updated to add new entries or re-score entries as required if a new scoring methodology is desired. For example, initialization can include determining if the image dataset has changed, and if so, trigger an update to add or remove items from the datastructure (e.g., repeating steps 310-340).

Image Scoring

Figure 4:
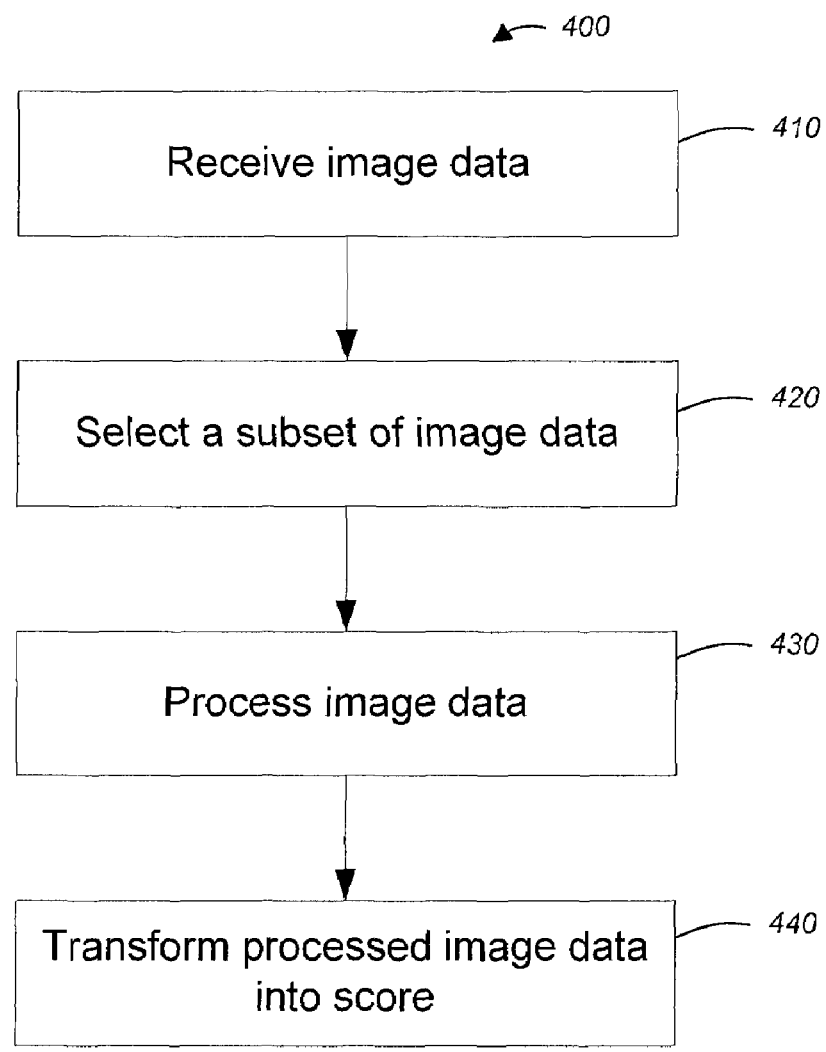
FIG. 4 shows a method of scoring image data.

As shown in FIG. 4, an exemplary method 400 for scoring an image includes receiving an item to be scored (e.g., an image, processed image, tile, thumbnail, etc.) 410. Both images from the image dataset, and image tiles can be scored using a same process. Optionally, a subset of item data is selected (e.g., a sampling of image data or tile data) for scoring (420). In one implementation, a subset of pixels from each image or tile is selected. In some implementations, the number of selected pixels can be equivalent to the total number of pixels associated with the image data. In another implementation, however, the number of selected pixels are considerably fewer than the number of pixels in the received image. The particular method of selection can differ among implementations. For example, in one implementation pixels can be selected randomly. In another implementation, a predetermined number of pixels are selected in an even distribution with respect to the number of rows and columns of pixels within the image data (i.e., given a two-dimensional image). For example, a pixel from every fourth row of pixels and fifth column of pixels can be selected. In other implementations, pixels can be sampled based on a predetermined pattern of selection. For example, pixels can be selected based on a zigzag pattern where, for example, a pixel is selected from every fourth row and fifth column where each column selection is offset by plus or minus one column in each successive row. Other patterns are possible.

The selected image data can be further processed (430). Further processing can include manipulations including compression, filtering or otherwise to facilitate an easier or more accurate scoring process. For example, an image can be blurred so the image has more uniform color. In one implementation, a noise-reduction image filter can be applied to the image data. These manipulations can also be applied to the item before the subset of pixels is selected.

The processed image data is used as a basis to compute a score 440. A score reflects, for example, the color properties of the sampled data (i.e., the selected data) and therefore the image from which the sample was taken. The score can be utilized to effectively compare image samples and therefore the images themselves. The exact operations that are carried out on the selected pixel data to produce a score can vary among implementations. In one implementation, the image data (e.g., pixels) can be used to calculate projection vectors for each color space encoded by each pixel (e.g., red, green and blue). For example, an implementation can sum each n-rows of pixels, for each color space encoded by each pixel (e.g., the three color spaces: red, green and blue), producing a horizontal projection vector n elements long for each color space. An implementation can produce many such projection vectors from the same image data (e.g., horizontal, vertical or diagonal projection vectors). The image data or, alternatively the projection vectors, can be subject to further processing, including image compression techniques that rely on frequency compression algorithms such as discrete Fourier transforms including discrete cosine transform (DCT) and discrete sine transform (DST), among others. The DCT transform can then operate on each projection vector, producing a feature vector n elements long. Given the compression properties of a DCT, the exemplary scoring system can ignore part of the feature vector (e.g., the last 4 of 8 elements can be discarded from each vector). This reduction of data facilitates the easy comparison and easy processing of the scoring data. In another implementation, a DST transform can also operate on the projection vectors, producing another feature vector n elements long. The DCT feature vectors with the DST feature vectors can be combined to produce a score. The combination enables the use of complementary information encoded in the transforms to yield a more optimal match. For example, in an implementation where n is eight, the top four values from the DCT feature vector and the second through fifth values from the DST feature vector can be concatenated to produce an eight value score for each projection and in each color. Other implementations can use other image compression techniques including, but not limited to transform coding (e.g., Huffman or Wavelets), spline approximation methods and fractal coding.

Rather than generate the score, some implementations can simply read the score of an image if the image has already been scored by an external process or application. For example, an image processing tool, or image capture device, can generate a score for each image and store the result within meta-data associated with each image file. In addition, one or more implementations can allow for multiple scoring strategies that are selected implicitly or explicitly (e.g., by the user, the system). That is, the item to be scored can be scored in plural ways, using plural methods, producing plural results. The respective results can be stored in separate datastructures to allow for the ready generation of multiple different mosaics. The multiple mosaics can be presented to the user for selection of a best representative mosaic. Thereafter, the associated scoring scheme that produced the selected mosaic can be used as a default. Other scoring systems and methods are possible.

Image Selection

Figure 5:
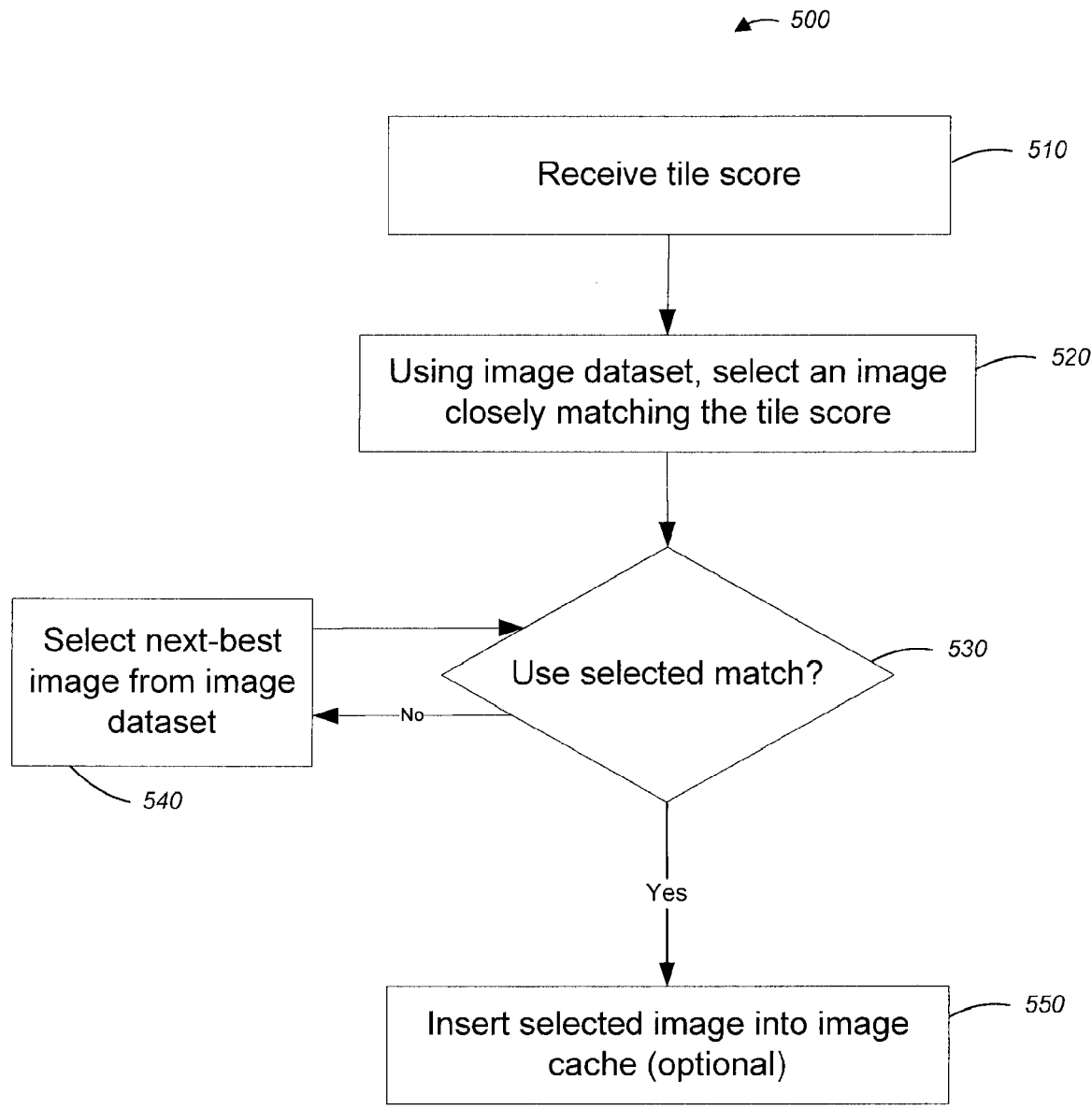
FIG. 5 shows a method of selecting images for use in a mosaic.

As shown in FIG. 5, a method 500 for selecting images used in the construction of the mosaic includes receiving the score of each tile 510. The received score is calculated in a manner compatible with the scores calculated for each image in the image dataset (e.g., see 330 of FIG. 3). Compatible scores are scores that can be compared with one another. Ideally, two different images that have approximately equal score will share some similar characteristics depending on the particular scoring method used by the implementation.

The score for a given tile is used to select an image from the image dataset to be used to replace a given tile in the mosaic 520. Using the received score, a similar (e.g., based on the scoring) image is retrieved from among the images contained in the image dataset. The selected image will be used to construct the mosaic, such that the selected image will replace the tile whose score was received. In alternative implementations, the selection process can include selecting a closest score. Alternatively, a function can be applied to the score of a given tile, and the selection process can be used to return an image from the dataset that most closely approximates the result of the function (e.g., $S=f(x)$, where x is the score of the tile being replaced, f is a function, and S is the resultant score that is used to locate an appropriate image in the datastructure that will be used in the mosaic).

Some implementations can include a step 530 which determines whether the image selected in step 520 should not be used. For example, in one implementation a screening step can be applied to ensure that no image is used more than once within a particular mosaic. Another implementation can chose not to use the selected image because the image has been recently used, or recently placed in close special proximity to the current tile being processed. Such implementations can elect to ignore the selected image and request a next-best image from the image dataset 540. Having retrieved the next-best image, the step of determining whether the next-best selection is suitable can be repeated and potentially another next-next-best image can be retrieved (e.g., repeating step 530). In one implementation this determination and re-selection procedure can repeat iteratively.

When an image is selected, operations necessary to transform the selected image into a size and shape equivalent to the tile which the selected image will replace can be performed as required. Transformation can include, but is not limited to operations such as scale, crop and rotate. For example, an implementation can alter the color of the selected image so that the image more closely matches the tile it will replace.

In some implementation, an image cache can be created 550 to keep track of images which are being used in the mosaic. In one implementation the image cache can include a list of images which are being used to construct the mosaic.

The image cache can include an identifier for the location of where the image is being used in the mosaic. The identifier can include references to the image, the image file, the image data, or transformed image data.

Mosaic Rendering

When presenting a mosaic for display, each tile in the identified image is replaced by the selected image as described above. One method for rendering is discussed in association with FIG. 6. In one implementation, the images in the image dataset and, in particular, those selected images which subsequently constitute the mosaic can be available in a variety of resolutions (e.g., as a result of sampling or other transformations). An image A is said to have higher resolution than image B if image A contains more image data than B. Furthermore, an image can be transformed to reduce its size (e.g., scaled or sampled) thus producing a new image of lower resolution than the image it was transformed from. Both images depict the same contents, but the higher-resolution image contains more detail. Some implementations can take advantage of display rendering systems (e.g., OpenGL or DirectX) that facilitate image display and image manipulations (e.g., enlargement to accomplish zooming). These rendering systems can receive images at various resolutions, even though when displayed the images can appear uniformly sized. Rendering systems can benefit from being provided higher-resolution, images because higher resolution images contain more detail than lower resolution images and thus will appear more accurate after, for example enlargement, compared to images of a lower resolution that have been equally enlarged. Zooming and enlargement are discussed below in association with FIG. 7.

Figure 6:
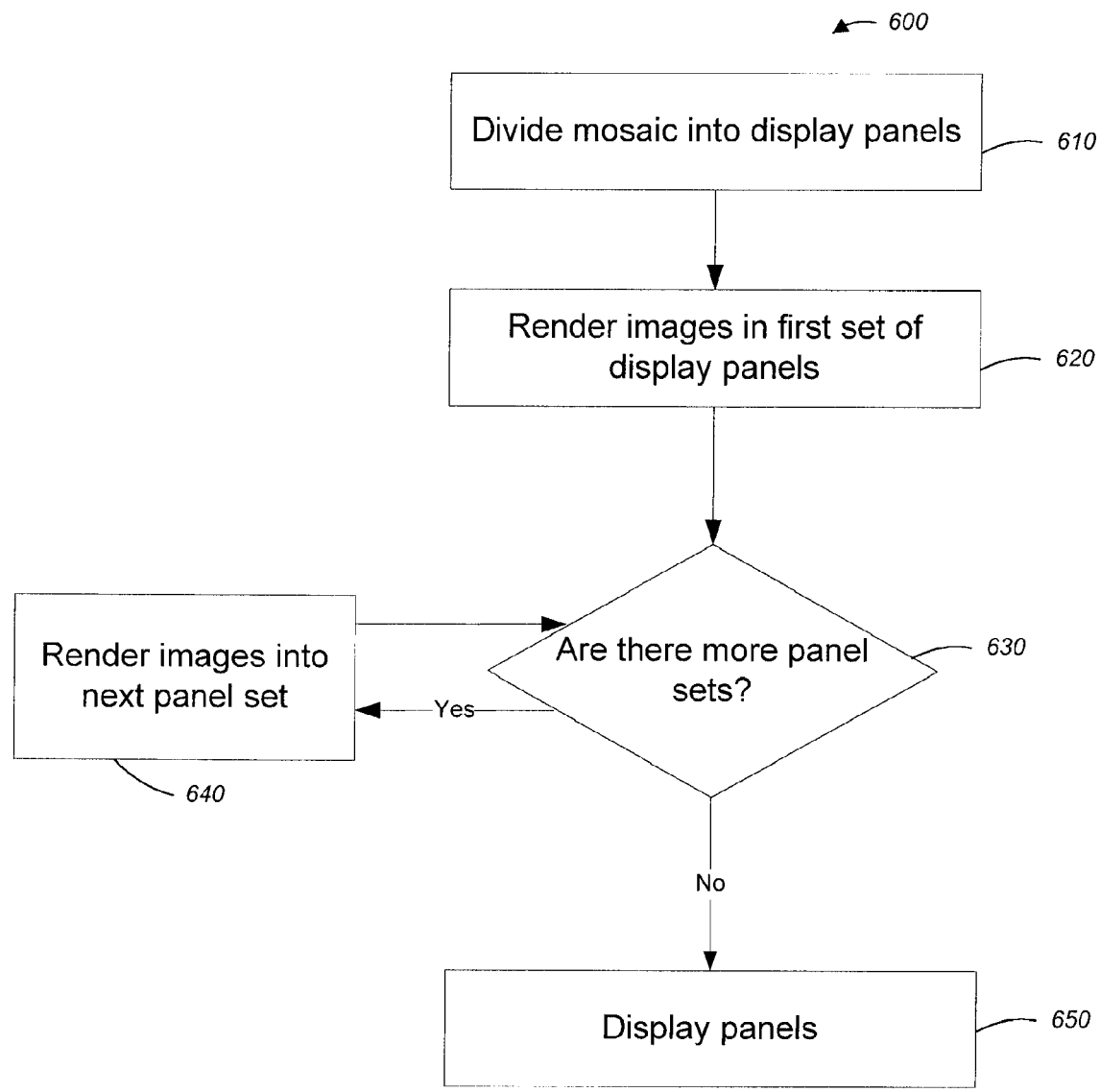
FIG. 6 shows a method of displaying a mosaic.

The rendering method shown in FIG. 6 includes the selection of plural image resolutions for use in such display rendering systems. In one implementation, resolution selection for a selected image that is to be used in the image can be based on each image's location with respect to the display surface in anticipation of a subsequent zooming operations (i.e., enlargement).

As shown in FIG. 6, a method 600 for presenting the mosaic includes dividing the mosaic into panels 610. For the purposes of these discussions, a panel represents a plurality of tiles. Each panel represents a region of the mosaic being displayed. A portion of the mosaic can be rendered onto each panel for subsequent display. The mosaic is initially divided into panels to isolate regions of the mosaic having a common display property. In one implementation, the common display property is resolution. That is, in one implementation, each tile in a given panel has a similar resolution. When zooming in toward a target image, as described below in association with FIG. 7, tiles in respective panels are scaled resulting in a zoom effect. As the zoom effect progresses, the focus of the zoom results in panels moving off screen. Zooming is discussed in greater detail below. An exemplary implementation of such a division scheme is shown in FIG. 8. Panels that share the same common property value belong to the same 'panel set'.

In FIG. 8, panels 801-804 are in the same panel set; panels 805-808 are in another panel set. If the displayed panels are enlarged (e.g., as a result of zooming; see below), the panels at the edge of the display will be the first to disappear off of the display, and thus will be subject to the least amount of enlargement before disappearing compared to the other panels. Therefore, lower resolution images can be rendered on to these panels which are subject to the least amount of enlargement (e.g., panels 801-804), while higher resolution images can be rendered into panels closer toward the centering tile (e.g., 813) (which may or may not correspond to the geometric center of either the mosaic or the display). The lowest resolution images will be rendered into the outside panels.

Returning to FIG. 6, images are rendered into the first set of display panels 620. For each subsequent panel set 630, images with common display properties are rendered 640. Having rendered portions of the mosaic into each panel set, the panels can be displayed 650. An implementation, as exemplified by the illustration shown in FIG. 8, specifies three sets of panels on which three differently sized (e.g., different resolutions) images can be rendered. For example the lowest resolution images, e.g., 30 pixels high by 40 wide, can be rendered into the first panel set (801-804), medium resolution images, e.g., 60 pixels high by 80 wide, can be rendered into the next panel set (805-808) and the highest resolution images can be rendered into the final panel set (809-813) (e.g., 180 pixels high by 240). When all panels have been rendered, the panels can be displayed.

Zooming in the Mosaic

Figure 7:
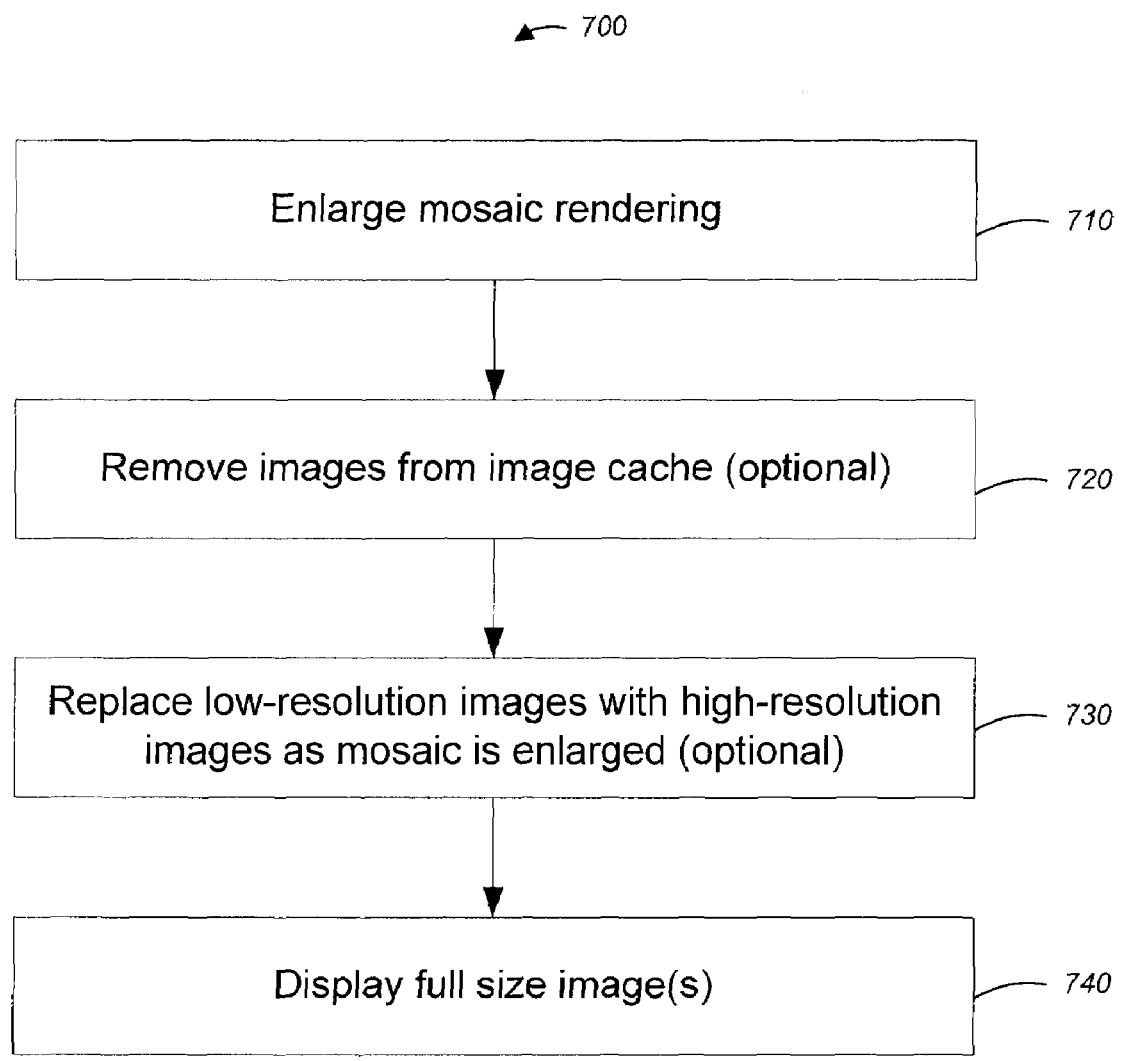
FIG. 7 shows a method of displaying a mosaic including zooming toward a particular tile.
Figure 8:
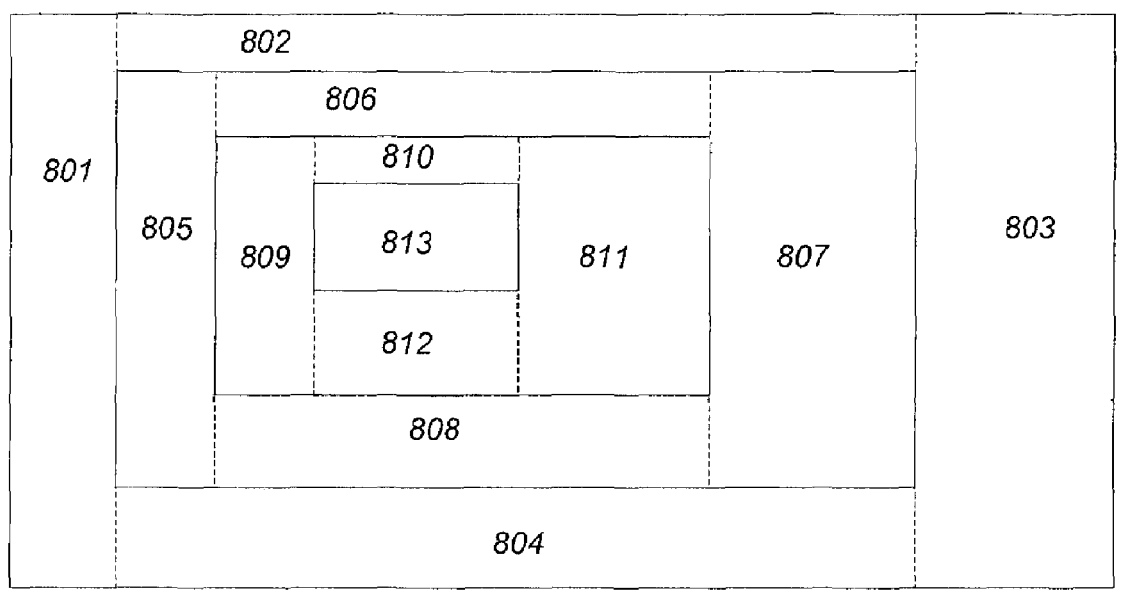
FIG. 8 shows a exemplary panel scheme for displaying a mosaic.

As shown in FIG. 7, a method 700 for zooming includes re-focusing and, in particular, enlarging, or alternatively, reducing, the rendering of the mosaic 710. Zooming refers to the enlargement or reduction of the contents of a display and can also include other image transformations such as re-centering the contents of the display. Enlargement of the mosaic allows the viewer of the mosaic an opportunity more closely examine the images which constitute the mosaic. Some implementations can enlarge the panels associated with the mosaic. Other implementations can scale the constituent images of the mosaic individually and display the mosaic using the enlarged images.

As the mosaic is enlarged, images that are at the periphery of the display will no longer be visible on the display surface. Therefore, as the image is zoomed, implementations that use an image cache (as described above), can remove images which are no longer being displayed in the mosaic as the mosaic is enlarged 720.

As described above, in one implementation, multiple, various-sized copies of the selected images can constitute the mosaic (e.g., low, medium and high resolution images). When enlarging the mosaic, advantageously, no additional transformations (i.e., other than scaling) of the images are then required. That is, as the method zooms in toward a target tile in the mosaic, the zooming and necessarily scaling of the surrounding images is easily accomplished without requiring substitution of higher resolution images. In one implementation, all tiles are at a highest resolution, thereby also not requiring any additional image transformations during the zoom process.

The zooming method ends when one or more of the constituent images of the mosaic is displayed 740. In one implementation, enlargement of the mosaic can continue until only one image is visible on the display. In another implementation, enlargement of the mosaic can continue until only a predetermined number (e.g., nine images, in three rows and three columns) are visible on the display. Some implementations can allow for selectable display behavior that is determined implicitly or explicitly (e.g., provided by the user or the environment).

Mosaic Screensaver Process

Figure 9:
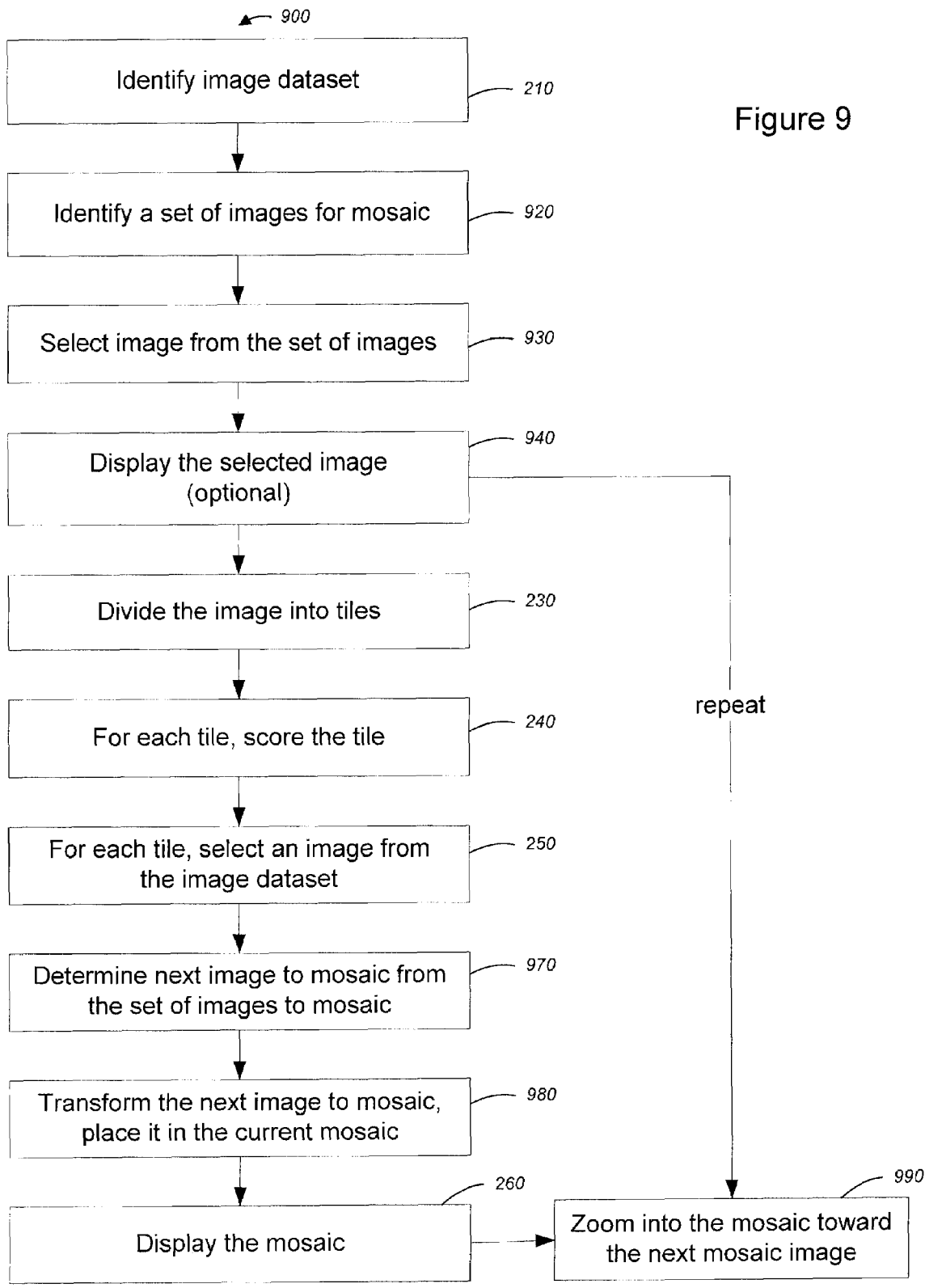
FIG. 9 shows a method of continuous generation and viewing of mosaics.

As shown in FIG. 9, a process 900 combines aspects of mosaic generation with mosaic zooming for continuous generation and viewing of mosaics (e.g., for use as a screensaver). An image dataset is identified or received 910. The image dataset contains images that will be used to construct each mosaic (see description above in association with FIG. 3). A set of images are identified which will be the basis of mosaic construction 920. As this process constructs multiple mosaics, a multitude of images are identified so that a multitude of mosaics can be displayed in sequence. From the set of identified images, one image is selected to be the basis of the first mosaic 930. The image can be selected at random, explicitly selected, or alternatively can be selected based on a property of each image or image file (e.g., alphabetical, latest by creation date, etc.). The selected image can optionally be displayed on the screen before being displayed as a mosaic 940. From the selected image, a mosaic is generated. Dividing the image into tiles, scoring the tiles and selecting images for each tile (steps 230 to 250 of process 900) are equivalent to the steps shown in FIG. 2 and described above. The next image to be displayed as a mosaic is determined 970. In one implementation, this image is selected from among the set identified in step 920. The image can be selected based on random order, or by properties of the image, set or file. In one implementation selection can be based on the alphabetical order or creation date of the files in the dataset. In another implementation selection can be based on the sequence or frequency of images already displayed (e.g., select the image least often displayed). The image selected for the next mosaic can optionally be transformed (e.g., scaled) and placed into the currently generated mosaic 980 (see below for details of how the image is placed). Thereafter, the generated mosaic is displayed 260. The displayed mosaic can be enlarged using a zooming process as described above in association with FIG. 7. In one implementation, as the mosaic is zoomed, the zooming can generally focus on the position of the next image (i.e., the next image that is to be the basis of a mosaic) in the currently displayed mosaic.

By placing the next mosaic image in the current mosaic, it is possible to seamlessly transition by zooming to the next mosaic. The placement of the next mosaic image in the current mosaic can be based on the score of the image and the scores of tiles in the mosaic. That is, in one implementation, a next mosaic image is selected and placed at a location in the mosaic where a best match occurs (e.g., at a location having a tile with an approximately equivalent scored tile). Alternatively, the position of the next-mosaic image can be determined randomly, pseudo randomly, by pre-set order (e.g., always in the center of the mosaic) or by characteristics of the environment (e.g., at the position where the mouse cursor was last recorded). A multitude of positioning schemes and related options can be determined automatically by the system or by the user.

User System Hardware Architecture

Figure 10:
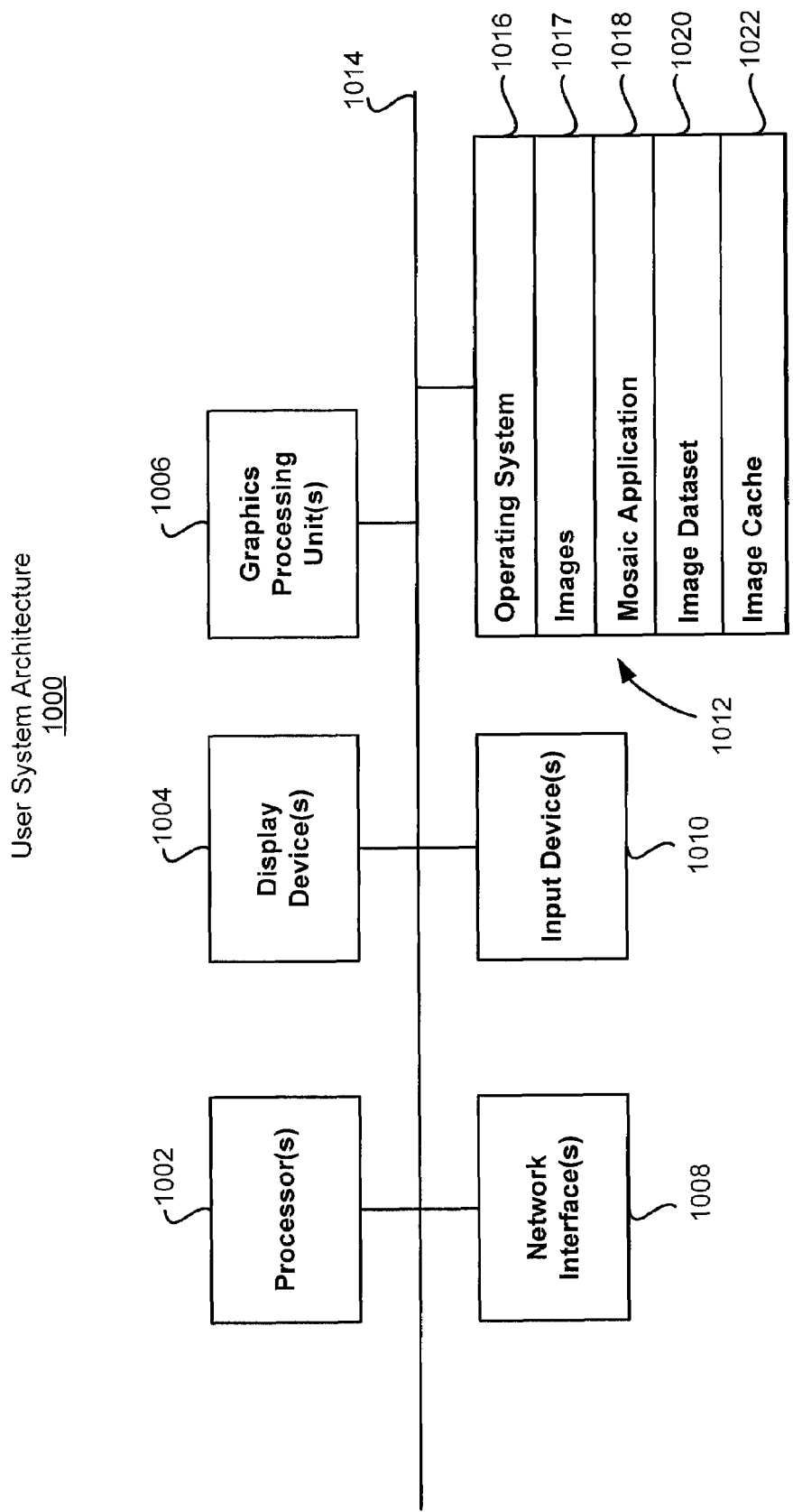
FIG. 10 shows a block diagram of an exemplary hardware architecture for generating or scoring mosaics.

FIG. 10 is a block diagram of an exemplary hardware architecture 1000 for a mosaic generation and display system. The architecture can be a desktop or portable computer or any other electronic device, including without limitation: a media player/recorder, a television set-top box, a mobile phone, a game console, a PDA or other handheld device, etc. Some of these user systems may implement a modified architecture 1000 using a combination of hardware and software.

The architecture 1000 includes one or more processors 1002 (e.g., PowerPC®, Intel Pentium® 4, etc.), one or more display devices 1004 (e.g., CRT, LCD), one or more graphics processing units 1006 (GPUs), one or more network interfaces 1008 (e.g., Ethernet, FireWire®, USB, etc.), input devices 1010 (e.g., keyboard, mouse, etc.), and one or more computer-readable mediums 1012 (e.g, RAM, ROM, SDRAM, hard disk, optical disk, flash memory, L1 and L2 cache, etc.). These components can exchange communications and data via one or more buses 1014 (e.g., EISA, PCI, PCI Express, etc.).

The term "computer-readable medium" refers to any medium that participates in providing instructions to a processor 1002 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves. The computer-readable medium 1012 further includes an operating system 1016 (e.g., Mac OS®, Windows®, Linux, etc.), images 1017, a mosaic application 1018, an image dataset 1020 and, optionally, an image cache 1022. The operating system 1016 can be multi-user, multiprocessing, multitasking, multithreading, real-time and the like. The operating system 1016 performs basic tasks, including but not limited to: recognizing input from input devices 1010; sending output to display devices 1004; keeping track of files and directories on computer-readable mediums 1012 (e.g., memory or a storage device); controlling peripheral devices (e.g., disk drives, printers, GPUs, etc.); and managing traffic on the one or more buses 1014.

The network communications module 1018 includes various components for establishing and maintaining network connections (e.g., software for implementing communication protocols, such as TCP/IP, HTTP, Ethernet, etc.). The mosaic application 1018 calculates and renders image mosaics, as described with respect to FIGS. 2-9. The image dataset 1020, initialized by mosaic application 1018, manages images which are eligible for use by the mosaic application 1020. Although the image dataset is shown as a separate entity from the mosaic application, the functionality of these two elements can be combined in some implementations. Some implementations can also have an image cache, which contains images. In some implementations images can be stored in more than one resolution. Although the image cache is shown as a separate entity from the image dataset, the functionality of these two elements can be combined in some implementations.

A number of implementations have been described. Nevertheless, it will be understood that various modifications may be made. Accordingly, other implementations are within the scope of the following claims.

What is claimed:

1. A method comprising:
    identifying a target image for presentation as a mosaic;
    dividing the identified target image into a plurality of tiles, each tile comprising a plurality of pixels;
    calculating one or more feature vectors based on at least one of a horizontal projection vector and a vertical projection vector, each of the horizontal projection vector and the vertical projection vector having a respective element length that is determined based at least in part on a number of pixel rows or pixel columns sampled from each tile, wherein calculating the feature vector comprises:
        compressing the horizontal projection vector and the vertical projection vector;
        selecting an element subset from each of the compressed horizontal projection vector and the compressed vertical projection vector, each element subset having a count of elements that is a function of the respective element length of the horizontal projection vector or the vertical projection vector and that is less than the respective element length; and calculating the feature vector based on the selected element subsets; and calculating a score for each tile based on the feature vectors; wherein the method is performed by a computer.

2. The method of claim 1, where the sampled pixel rows are evenly distributed in the tile.

3. The method of claim 2, where the sampled pixel columns are evenly distributed in the tile.

4. The method of claim 1 where dividing includes dividing the image into a plurality of equal sized tiles.

5. The method of claim 4 where the tiles are rectangular.

6. The method of claim 1 where dividing includes dividing the image into a plurality of tiles having at least two different sizes.

7. The method of claim 1 where dividing includes dividing the image into a plurality of tiles having at least two different shapes.

8. The method of claim 1 where calculating the feature vectors further includes calculating the vertical projection vectors and horizontal projection vectors based on color of the pixels.

9. The method of claim 1, where compressing the vertical projection vectors and horizontal projection vectors includes transforming the vertical projection vectors and horizontal projection vectors using one or more of a discrete cosine or discrete sine transform.

10. The method of claim 1, where the compression includes frequency compression.

11. The method of claim 1, where the function of the respective element length is a fraction of the respective element length.

12. The method of claim 11 where the fraction of the respective element length is half of the respective element length.

13. The method of claim 1, further comprising:
identifying a matching image for each tile from an image dataset based on the score of the corresponding tile; and
rendering the mosaic using the matching images.

14. The method of claim 13 where identifying a matching image includes evaluating thumbnail images.

15. The method of claim 13 where identifying a matching image includes identifying potentially matching images, scoring the potentially matching images and locating a best matching image from the scored potentially matched images.

16. The method of claim 15 where scoring potentially matching images includes scoring a lesser resolution image associated with each potentially matching image.

17. The method of claim 16 where the lesser resolution image is a thumbnail.

18. The method of claim 13 where identifying a matching image from the image dataset using the score for each tile includes identifying an image with a score closest to the score of the tile.

19. The method of claim 13 where the dataset is a kd-tree and identifying includes searching the kd-tree for the matching image.

20. The method of claim 13 further comprising storing the dataset in association with scores for each image in the dataset.

21. The method of claim 13 where the image dataset is retrieved from storage.

22. The method of claim 13 further comprising:
prior to displaying the target image, identifying a next image for presentation as the mosaic;
replacing a matching tile in the image with the next image; and
rendering the mosaic using the matching images and the next image.

23. The method of claim 22 further comprising:
zooming toward the next image including scaling the mosaic.

24. The method of claim 23 including:
stopping zooming when the next image occupies a predetermined portion of a display.

25. The method of claim 24 where the predetermined portion is the whole display.

26. The method of claim 24 where the predetermined portion includes a predetermined number of whole or partial images along with the next image.

27. The method of claim 13, further comprising:
identifying a next image in the mosaic, the next image being one of the matching images;
zooming the mosaic toward the next image; and
creating a second mosaic, using the next image as a second target image.

28. The method of claim 27 wherein:
zooming toward the next image including scaling the mosaic.

29. The method of claim 28 including:
stopping zooming when the next image occupies a predetermined portion of a display.

30. The method of claim 29 where the predetermined portion is the whole display.

31. The method of claim 29 where the predetermined portion includes a predetermined number of whole or partial matching images along with the next image.

32. A computer program product, encoded on a non-transitory storage device, operable to cause a data processing apparatus to perform operations comprising:
identifying, by the data processing apparatus, a target image for presentation as a mosaic;
dividing, by the data processing apparatus, the identified image into a plurality of tiles, each tile comprising a plurality of pixels;
calculating, by the data processing apparatus, one or more feature vectors based on at least one of a horizontal projection vector or a vertical projection vector, each of the horizontal projection vectors and the vertical projection vector having respective element length that is determined based at least in part on a number of pixel rows or pixel columns sampled from each tile, wherein calculating the feature vector comprises:
compressing the horizontal projection vector and the vertical projection vector using compression;
selecting an element subset from each of the compressed horizontal projection vector and the compressed vertical projection vector, each element subset having a count of elements that is a function of the respective element length of the horizontal projection vector or the vertical projection vector and that is less than the respective element length; and
calculating, by the data processing apparatus, the feature vector based on the selected element subsets; and
calculating a score for each tile based on the feature vectors.

33. The program product of claim 32, wherein the pixel columns and subset of pixel rows are evenly distributed in each tile.

34. The program product of claim 33, the operations further comprising:
identifying a matching image from an image dataset using the score for each tile; and
rendering the mosaic using the matching images.

35. A system, including one or more computers configured to perform operations comprising:
identifying a target image to be presented as a mosaic;
dividing the identified target image into a plurality of tiles, each tile comprising a plurality of pixels;
calculating one or more feature vectors based on at least one of a horizontal projection vector and a vertical projection vector, each of the horizontal projection vector and the vertical projection vector having a respective element length that is determined based at least in part on a number of pixel rows or pixel columns sampled from each tile, wherein calculating the feature vector comprises:
compressing the horizontal projection vector and the vertical projection vector using compression;
selecting an element subset from each of the compressed horizontal projection vector and the compressed vertical projection vector, each element subset having a count of elements that is a function of the respective element length of the horizontal projection vector or the vertical projection vector and that is less than the respective element length; and
calculating the feature vector based on the selected element subsets; and
calculating a score for each tile based on the feature vectors.

36. The system of claim 35, the operations further comprising:
for each tile, identifying a matching image from an image dataset based on the corresponding score; and
presenting the mosaic using the matching images.

37. The method of claim 3, where:
each of the horizontal projection vectors is generated for a color space in a color space set; and
each of the vertical projection vectors is generated for a color space in the color space set.

38. The method of claim 37, where:
compressing the horizontal projection vector and the vertical projection vector includes:
transforming at least one of the vertical projection vectors or one of the horizontal projection vectors into a discrete cosine transform (DCT) feature vector using a DCT;
transforming the at least one of the vertical projection vectors or one of the horizontal projection vectors into a discrete sine transform (DST) feature vector using DST; and
selecting the element subsets includes:
selecting a first element subset from the DCT feature vector; and
selecting a second element subset from the DST feature vector; and
calculating the feature vector includes:
creating the feature vector based at least in part on a combination of the first element subset and the second element subset.

39. The method of claim 38, where the first element subset and the second element subset each has a count of elements that corresponds to a half of the count of elements of the horizontal projection vector or half of the count of elements of the vertical projection vector.

40. The method of claim 39, where:
the first element subset is selected from elements from a beginning of the DCT feature vector; and
the second element subset is selected from elements from a beginning of the DST feature vector, excluding a top element in the DST feature vector.

\* \* \* \* \*